Feb. 21, 1967  F. P. BRILANDO  3,305,048
BRAKE BLOCK RETAINERS
Filed April 30, 1965

Inventor:
Frank P. Brilando
By: Horton, Davis, Brewer & Brugman
Attys.

United States Patent Office 3,305,048
Patented Feb. 21, 1967

3,305,048
BRAKE BLOCK RETAINERS
Frank P. Brilando, Niles, Ill., assignor to Arnold, Schwinn & Co., Chicago, Ill., a corporation of Illinois
Filed Apr. 30, 1965, Ser. No. 452,076
1 Claim. (Cl. 188—24)

This invention relates to brake block retainers, and more particularly to brake block retainers of the type used in caliper brakes on bicycles and the like, wherein opposed brake blocks frictionally engage opposite sides of a braking surface, such as a wheel rim.

Since the normal braking forces usually encountered in the use of bicycles are those for stopping forward motion and are monodirectional, it has been customary to supply brake block retainers which have block retaining flanges at one end and along the upper and lower surfaces of the block. The end flanges were placed for retention of the brake block against movement with the wheel rim during forward motion of the bicycle; that is, with the end flanges at the front ends of the brake blocks on opposite sides of the wheel rim, so that the flanges prevent forward movements of the brake blocks with the forward motion of the top portion of the wheel rim. It has been found however that there are instances in which the forces exerted on the brake blocks by the wheel rim are rearward, so that the brake blocks were caused to be dislodged from their retainers and lost. One such instance which has been common has occurred when a bicycle rider sits astride the bicycle on the seat while the bicycle is generally stationary and has his feet and legs extended forwardly so as to exert a rearward component of force while applying the brake. In another instance a rider may push the bicycle rearwardly by use of the feet on the ground and use the brake during the maneuver, as to turn around quickly in a small space.

One of the objects of this invention is to provide a brake block retainer for use on caliper brakes and which positively retains the block against endwise movement in either direction, as well as in other directions.

Another object of the invention is to provide a brake block retainer of the type to which reference has been made and which is compatible with those formerly in use for adding endwise restraint to brake block movement by the addition of a part to the formerly used structure.

This invention further has within it purview the provision of a brake block retainer which restrains the brake block from endwise movement in either direction and which embodies parts adjustable relative to one another for effecting snug retention of the brake blocks which may vary somewhat in length.

Other objects and advantages of my invention will be apparent from the following description and drawings in which.

In the exemplary embodiment of the invention which is shown in the accompanying drawings for illustrative purposes, a brake mechanism 10 is shown in one relatively conventional application wherein brake blocks, such as 12, are mounted for swinging movements on brake arms 13 and 14 at positions aligned with opposite side faces 15 of a bicycle wheel rim 16. When brought into engagement with the opposite side faces of the wheel rim by manually applied force, the brake blocks resist movements of the bicycle wheel and thereby tend to bring the wheel to a stop. Such brakes are usually associated with both the front and rear wheels of a bicycle and are subject to separate actuation for resisting normal forward movements of the bicycle. However, since the braking mechanism, and particularly the brake blocks and their retainers, are substantially the same for application in both positions, a description of the structure of this invention with respect to an application of the braking mechanism of the front wheel of a bicycle will suffice as an illustrative embodiment of the application of this invention.

Figure 1:
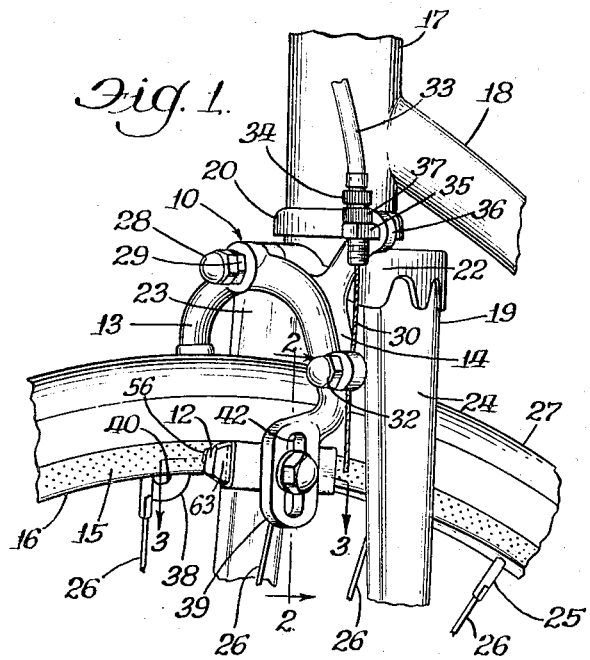
FIG. 1 is a fragmentary perspective view illustrating the adaptation of a preferred emodiment of this invention to the front wheel of a bicycle.

As depicted in FIG. 1, the illustrated portions of the bicycle include a head tube 17 which is adjoined by a lower reach tube 18 and in which a steering post (not shown) on the top of a front fork 19 is supported for rotation by means including an outer bearing race 20. The front fork has a bridge portion 22 which has the steering post secured to the mid-portion of the top thereof and has side arms 23 and 24 secured to its opposite sides and extending downwardly therefrom for engagement with a front wheel shaft (not shown), whereupon a front wheel 25, including the rim 16, spokes 26 and a tire 27, is mounted for rotational movement.

The brake arms 13 and 14 overlap one another adjacent the front mid-region of the bridge portion 22 of the fork and are adjoined for relative swinging movements by a bolt (not shown) which is journaled in the overlapping portions of the respective brake arms and extends through the mid-region of the bridge portion 22 of the fork to secure the brake arms thereto. Fastening means, such as an acorn nut 28 and a lock nut 29 are threaded onto the end of the brake arm supporting bolt for retaining the brake arms in place thereon. A spring (not shown) has a mid-region anchored relative to the bolt which supports the brake arms and has end regions extending outwardly along the arms and engaged therewith for normally biasing the arms away from the opposite sides of the wheel 25 and its rim 16. A brake-actuating cable 30 is secured to one end of the brake arm 14 by a cable bolt having a nut 32. This brake cable 30 is carried for longitudinal sliding movement in a relatively flexible cable conduit 33 to a manually operable brake-actuating lever (not shown) by which the brake is actuated from a remote position, such as one near the hand-grip on one side of a handlebar. The lower end of the conduit 33 is mounted in an adjusting barrel 34 which is in turn threaded into a side lug 35 secured to an extension lever 36 on the brake arm 13. The brake cable 30 extends through the adjusting barrel 34 and a lock nut 37 is provided on the adjusting barrel 34 for securing the barrel in place relative to the lever 36 on the brake arm 13.

Figure 2:
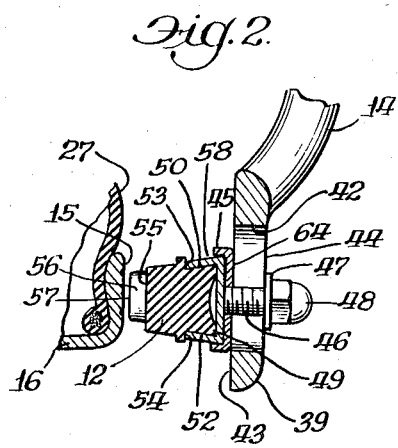
FIG. 2 is a fragmentary front sectional view drawn to a larger scale than FIG. 1 and taken substantially as indicated by a line 2—2 and accompanying arrows in FIG. 1.

The brake arms 13 and 14 extend downwardly along opposite side portions of the wheel, with lower end portions 38 and 39 respectively on opposite sides of the rim 16 and normally spaced outwardly from the rim and tire. The lower end portions 38 and 39 have slots 40 and 42 extending longitudinally thereof and, as depicted in FIG. 2 with respect to the end portion 39 on the brake arm 14, both end portions of the brake arms have substantially flat and parallel side faces 43 and 44. The brake blocks 12 are made of non-metallic wear-resistant frictional material, such as relatively hard rubber, and are secured to the end portions 38 and 39 of the brake arms 13 and 14 in alignment with opposite side faces 15 of the wheel trim 16 by retainers, such as 45. The retainers 45 include studs 46 which extend outwardly through the slots 40 and 42 in the lower portions of the brake arms 13 and 14 and are secured in place by fastening means, such as washers 47 and nuts 48. Since the slots 40 and 42 extend longitudinally of the brake arms 13 and 14, it may be observed that the brake blocks 12 can be aligned for engagement with opposite side faces of the rim 16 before the nuts 48 are tightened. Also, since the studs 46 are rotatable in the slots 40 and 42, the retainers 45 and their respective brake blocks may be brought into longitudinal alignment with the opposed side faces of the wheel rim.

Figure 3:
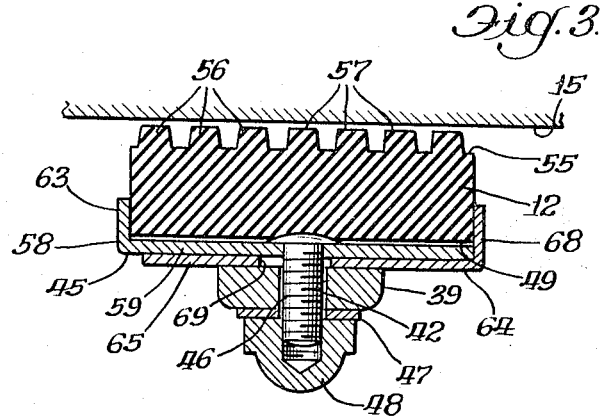
FIG. 3 is a fragmentary top sectional view taken substantially as indicated by a line 3—3 and accompanying arrows in FIG. 1.
Figure 4:
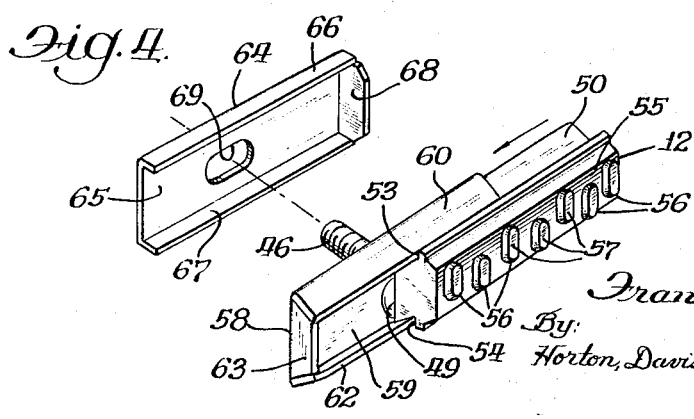
FIG. 4 is an exploded perspective view of an assembly of a brake block and its retainer, of the type utilized in the forms illustrated in FIGS. 1, 2 and 3.

Considering the brake blocks and their retainers in greater detail, and with particular reference to FIGS. 2, 3 and 4, the brake blocks have relatively flat back surfaces 49 and longitudinally parallel side surfaces 50 and 52 which extend inwardly from the back surface and converge toward one another in a direction away from the back surface. The converging side surfaces 50 and 52 terminate at longitudinally extending lateral shoulders 53 and 54, from which shoulders, the brake block extends inwardly to an inner surface 55. On the brake block disclosed, a plurality of bosses 56 project inwardly from the inner surface 55 in spaced relationship to one another longitudinally of the block, as shown in FIGS. 3 and 4, to provide a plurality of frictional faces 57 which are adapted frictionally to engage the surfaces of the wheel rim to afford braking action.

Each retainer 45 includes a channel-type metal part 58 having a web 59 and side flanges 60 and 62 which extend in converging relationship from the web 59. The inner surface of the web 59, between the side flanges 60 and 62, is of a width for engagement with the back surface 49 of the brake block. When the brake block is slid longitudinally between the side flanges 60 and 62 with the back surface 49 of the block engaged with the inner surface of the web 59, the flanges 60 and 62 conform substantially to the convergence of the side surfaces 50 and 52 of the block, so that the block is gripped between flanges 60 and 62 and cannot be moved directly away from the retainer part 58. An end flange 63 is also provided on the retainer part 58 for engagement with one end of the block 12 for retaining the block against endwise movement in one direction, particularly in the direction of movement of the side surfaces of the wheel rim during forward movement of the bicycle. In the disclosed structure, the flanges 60 and 62 on the part 58 extend into engagement with the shoulders 53 and 54 on the brake block. Stud 46 extends through the mid-region of the web of the retainer part 58 and projects outwardly therefrom for mounting in one of the slots in the lower portion of one of the brake arms, as described.

For further effecting confinement of the brake block 12 in the retainer 45, a second channel-type metallic part 64 has a web 65 with flanges 66 and 67 extending inwardly in generally parallel relationship to one another along opposite sides of the web. Also, the part 65 has an end flange 68 thereon for engagement with the end of the brake block opposite the end flange 63 on the part 58. The web 65 is of a size to fit over the exterior of the web 59 of the part 58 with the flanges 66 and 67 overlapping marginal portions of the flanges 60 and 62 on the part 58 for retaining the parts 58 and 64 in aligned relationship to one another. An opening 69 is provided in the web 65 of the part 64, through which the stud 46 passes in the assembly of the brake block and retainer. The opening 69 is elongated longitudinally of the web to provide for relative longitudinal movement between the parts 58 and 64, thereby to bring the end flanges 63 and 68 into snug engagement with opposite ends of the brake block in the assembly, as when brake blocks of different lengths may be substituted for one another in the replacement of a worn brake block.

In the operation of the disclosed caliper-type brake mechanism, the brake arms 13 and 14 are normally biased away from the wheel rim and relative to one another by a spring, as aforementioned. In their normal, adjusted, and released position the frictional faces 57 of the brake blocks 12 are spaced somewhat from the opposed side faces 15 of the rim, so that there is no braking action. However, when braking force is manually applied through the cable 30, the brake arms 13 and 14 swing relative to one another, so that their end portions 38 and 39 move toward one another and the frictional faces 57 of the brake blocks are brought into engagement with the side faces 15 of the rim. In this instance, and with the disclosed relationship of parts, during forward movement of the bicycle, the end flange 63 on the part 58 prevents endwise movements of the brake blocks relative to the retainers 45. If and when the bicycle is moved rearwardly or forces are applied tending to move the bicycle rearwardly while the brake is applied, the flange 68 on the part 64 prevents endwise movement of the brake block relative to its retainer. Since the side flanges 60 and 62 are disposed to prevent both lateral and inward movements of the brake block relative to the retainer and since the end flanges 63 and 68 on the parts 58 and 64 can be brought into snug engagement with the ends of the brake block, the brake block is firmly and tightly held in its operative position during use and is readily replaceable by disassembly of the retainer parts.

It is thus understood that the foregoing description is merely illustrative of further embodiments of this invention and that the scope of this invention is not to be limited thereto, but is to be determined by the appended claim.

I claim:

In a caliper brake for use on bicycles and the like, and wherein said brake embodies brake arms mounted on a part of the bicycle with end portions on opposite sides of a wheel rim and supported for individual swinging movements relative to one another, means normally biasing the brake arms to positions in which said end portions are spaced from the opposite sides of the wheel rim, and means for actuating said brake arms against said normal bias to effect movements of said end portions toward said opposite sides of the rim, the combination comprising a brake block having back and front portions of different sectional shapes extending longitudinally of the block, said back portion having a generally flat back face and side surfaces which taper toward one another in a direction away from the back face, and said front portion projecting forwardly from the back portion toward a front braking surface and having shoulders projecting laterally from the forward extremities of said side surfaces of the back portion; and a two part brake block retainer for securing one of said brake blocks to each of said end portions of the brake arms in alignment for engagement of the braking surfaces thereof with opposite sides of said wheel rim, said retainer including a first channel-type metal part with a web having an inner surface of a size to fit against the back face of said brake block, an end flange for engagement with one end of the brake block, side flanges on opposite sides of said web and tapered toward one another in a direction away from the web to conform substantially to the side surfaces of said back portion of the brake block and to cover the said side surfaces to positions adjacent said shoulders, and a threaded stud projecting from the mid-region of said web in a direction opposed to said flanges for use in securing said first metal parts to said end portions of the brake arms; and a second channel-type metal part having a web with an opening therein through which said stud may extend, said web of the second metal part also having thereon an end flange for engagement with the end of said brake block other than said one, and side flanges for engagement with marginal portions of said side flanges on the first metal part for retaining the metal parts in longitudinal alignment; threaded means for engagement with said stud to hold said metal parts in assembled relation and secure them to the end portions of said brake arms, and said opening in the second metal part being elongated longitudinally of the part, so that said metal parts are relatively movable longitudinally for bringing said end flanges of the parts into engagement with brake blocks of different lengths.

References Cited by the Examiner

UNITED STATES PATENTS 1,246,386  11/1917  Bly.

FOREIGN PATENTS 882,501  6/1943  France.
898,521  4/1945  France.
973,045  2/1951  France.
1,000,840  2/1952  France.

MILTON BUCHLER, *Primary Examiner.*

B. S. MOWRY, *Assistant Examiner.*